US006765568B2

United States Patent
Swift et al.

(10) Patent No.: US 6,765,568 B2
(45) Date of Patent: Jul. 20, 2004

(54) ELECTRONIC STEREOSCOPIC MEDIA DELIVERY SYSTEM

(75) Inventors: David C. Swift, Cortlandt Manor, NY (US); Michael L. Roche, Jr., Pomona, NY (US); Jon Siragusa, Brooklyn, NY (US); Adam W. Divelbiss, Wappingers Falls, NY (US)

(73) Assignee: Vrex, Inc., Elmsford, NY (US)

( * ) Notice: Subject to any disclaimer, the term of this patent is extended or adjusted under 35 U.S.C. 154(b) by 420 days.

(21) Appl. No.: 09/879,420

(22) Filed: Jun. 12, 2001

(65) Prior Publication Data

US 2002/0122585 A1 Sep. 5, 2002

Related U.S. Application Data

(60) Provisional application No. 60/211,092, filed on Jun. 12, 2000.

(51) Int. Cl.[7] .............................................. G06T 15/00
(52) U.S. Cl. ........................................................ 345/419
(58) Field of Search ................................. 345/419, 420; 382/154

(56) References Cited

U.S. PATENT DOCUMENTS 6,496,598 B1 * 12/2002 Harman ...................... 382/154

FOREIGN PATENT DOCUMENTS

| EP | 860729 A3 | 8/1998 |
| EP | 860729 A2 | 8/1998 |
| EP | 953962 A3 | 11/1999 |
| EP | 953962 A2 | 11/1999 |
| WO | WO9731305 A2 | 8/1997 |

* cited by examiner

Primary Examiner—Almis R. Jankus
(74) Attorney, Agent, or Firm—Gerow D. Brill; Ralph J. Crispino

(57) ABSTRACT

The preferred embodiment addresses the problem of delivering stereoscopic media in electronic form (images, videos, animations, object models, etc.). First, it provides a single format with independent right and left channels to represent the stereoscopic media. Second, it provides a means of displaying stereoscopic media inside a movable windowed area while eliminating pseudostereo conditions during movement. Third, it provides automatic and manual optimization adjustments (parallax shift adjustment, brightness control, color adjustment, and cross-talk reduction) to the stereoscopic media based on viewing hardware, monitor size, and media content for optimal viewing quality. Fourth, it provides seamless support for monoscopic (2D) viewing modes allowing delivery of said stereoscopic media in a normal 2D viewing mode.

32 Claims, 12 Drawing Sheets

Figure 5. General Software flowchart

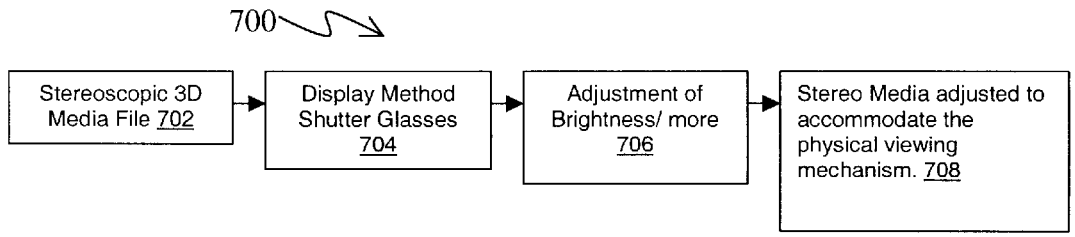
Figure 8
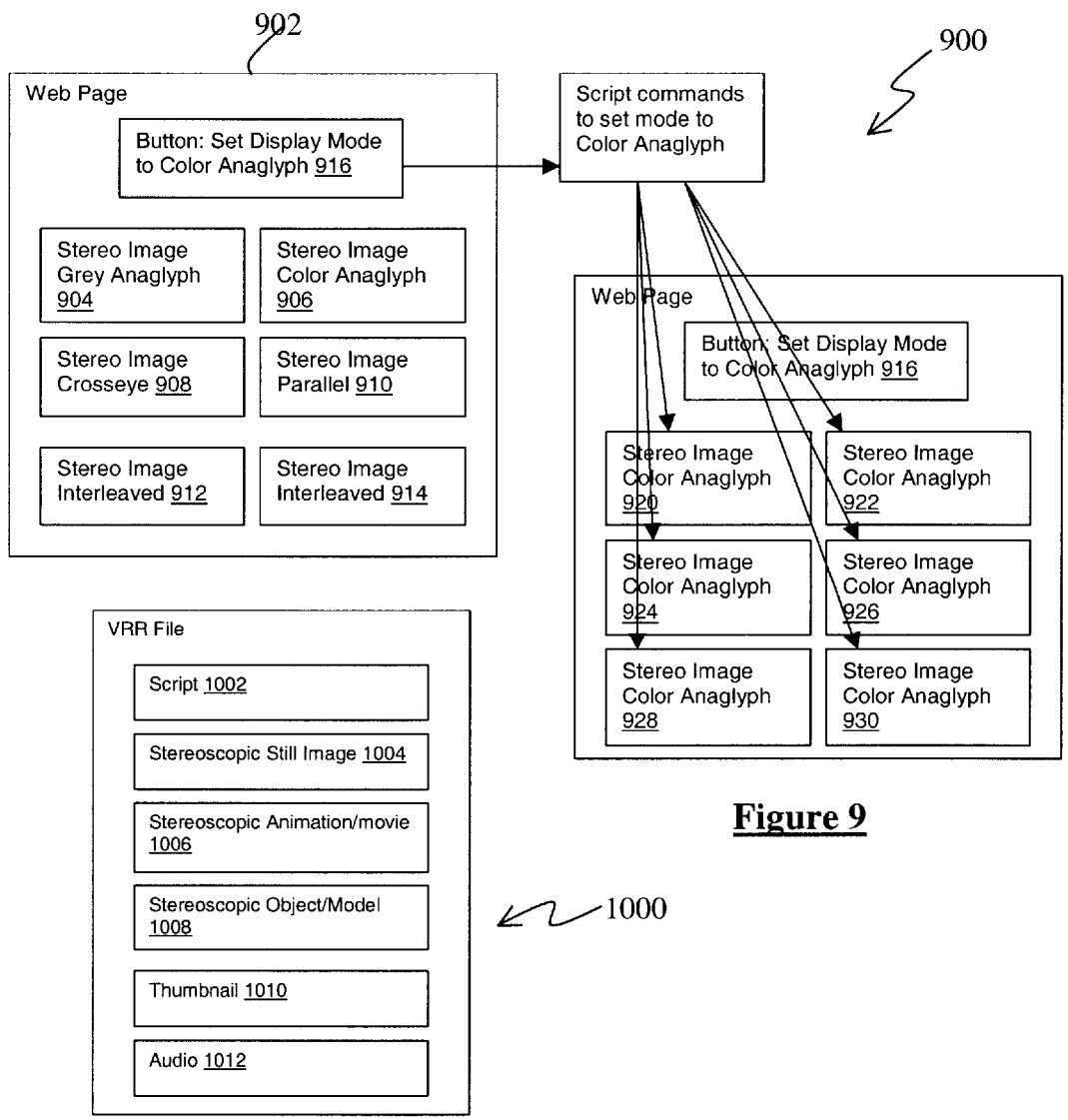
Figure 9
Figure 10

Cross eye viewing mode

Object Movie VRR File

ELECTRONIC STEREOSCOPIC MEDIA DELIVERY SYSTEM

This application claims the benefit of Provisional Application No. 60/211,092, filed Jun. 12, 2000.

TECHNICAL FIELD

The invention is directed to providing a means of delivering stereoscopic media on and off the Internet. In particular the invention provides a means of encoding stereoscopic media, transmitting and storing stereoscopic media, displaying stereoscopic media, and providing helpful tools for viewing the media.

BACKGROUND OF THE INVENTION

Stereoscopic images have been in use for hundreds of years. Recently stereoscopic images, and other forms of stereoscopic media like animations and video, have been converted to electronic form for display on personal computers, the Internet, and on other electronic media like CD-ROMs. Stereoscopic media has been successfully used in numerous applications ranging from medical imaging, to entertainment, to training, to electronic commerce.

Stereoscopic media and viewing systems can take on numerous formats. For example, there are several ways to encode a still stereoscopic 3D image including red/blue anaglyphic format, side-by-side, interleaved or line-alternate formats, etc. There are also numerous viewing systems available to viewing stereoscopic media: red/blue glasses, active shutter glasses, high-speed page-flipping graphics cards with shutter glasses, line-blanking viewing systems, cross-eye lens systems, etc. Many of these media and viewing formats are not compatible with each other. The fact that the stereoscopic media for these various systems is not compatible makes it difficult for a content developer, such as a CDROM developer, or Website developer, to support all of the stereoscopic viewing devices on the market.

Several patents contain background information for this disclosure. They include: U.S. Pat. No. 6,028,649 dated Feb. 22, 2000 and entitled "Image Display Systems having Direct and Projection Viewing Modes"; U.S. Pat. No. 6,016,159 dated Jan. 18, 2000 and entitled "Method and Apparatus for Producing and Displaying Spectrally-multiplexed Images of Three-dimensional Imagery for Use in Stereoscopic Viewing Thereof"; U.S. Pat. No. 6,002,518 dated Jan. 14, 1999 and entitled "Phase-retardation Based System for Stereoscopic Viewing Micropolarized Spatially-multiplexed Images Substantially Free of Visual-channel Cross-talk and Asymmetric Image Distortion"; U.S. Pat. No. 5,844,717 dated Dec. 1, 1998 and entitled "Method and System for Producing Micropolarization panels for Use in Micropolarizing Spatially Multiplexed Images of 3-D Objects During Stereoscopic Display Processes"; U.S. Pat. No. 5,828,427 dated Oct. 27, 1998 and entitled "Computer-based Image Display Systems Having Direct and Projection Modes of Viewing"; U.S. Pat. No. 5,760,827 dated Jun. 2, 1998 and entitled "Pixel-data Processing System and Method for Producing Spectrally-multiplexed Images of Three-dimensional Imagery for Use in Stereoscopic Viewing Thereof"; U.S. Pat. No. 5,745,164 dated Apr. 28, 1998 entitled System and Method for Electro-optically Producing and Displaying Spectrally-multiplexed Images of Three-dimensional Imagery for Use in Stereoscopic Viewing Thereof"; U.S. Pat. No. 5,7423,33 dated Apr. 21, 1998 and entitled "Electro-optical Device for Selectively Transmitting Polarized Spectral Components"; U.S. Pat. No. 5,680,233 dated Oct. 21, 1997 and entitled Image Display Systems Having Direct and Projection Viewing Modes"; U.S. Pat. No. 5,553,203 dated Sep. 3, 1996 and entitled "Pixel Data Processing System and Method for Producing and Graphically Presenting Spatially Multiplexed Images of 3-D Objects for Stereoscopic Viewing Thereof"; U.S. Pat. No. 6,031,564 dated Feb. 29, 2000 and entitled "Method and Apparatus for Monoscopic to Stereoscopic Image Conversion"; U.S. Pat. 6,011,581 dated Jan. 4, 2000 and entitled "Intelligent Method and System for Producing and Displaying Stereoscopically-multiplexed Images of Three-dimensional Objects for Use in Realistic Stereoscopic Viewing Thereof In Interactive Virtual Reality Display Environments"; and U.S. Pat. No. 5,537,144 dated Aug, 16, 1996 and entitled "Electro-optical Display System for Visually Displaying Polarized Spatially Multiplexed Images of 3-D Objects for Use in Stereoscopically Viewing The Same With High Image Quality and Resolution.

In order to facilitate the growth of stereoscopic 3D media in electronic form, an easy to use, multi-format delivery system is needed. This invention presents new stereoscopic media delivery system that includes means for encoding stereoscopic media, transmitting and storing stereoscopic media, displaying stereoscopic media, and providing helpful tools for viewing the media.

SUMMARY OF THE INVENTION

The preferred embodiment addresses the problem of delivering stereoscopic media in electronic form (images, videos, animations, object models, etc.). Firstly, it provides a single format with independent right and left channels (with an option for mixed or combined right and left channels) to represent the stereoscopic media. Secondly, it provides a means of displaying stereoscopic media inside a movable windowed area while eliminating pseudostereo conditions during movement. Thirdly, it provides automatic and manual optimization adjustments such as parallax shift adjustment, brightness control, color adjustment, and cross-talk reduction to the stereoscopic media based on viewing hardware, monitor size, and media content for optimal viewing quality. Fourthly, it provides seamless support for monoscopic (2D) viewing modes allowing delivery of said stereoscopic media in a normal 2D viewing mode.

These and other features of the present invention will be apparent from the following description of the drawings, detailed description, and appended claims and drawings.

BRIEF DESCRIPTION OF THE DRAWINGS

FIG. 8 illustrates the automatic brightness adjustment of a stereoscopic 3D media file;

FIG. 9 illustrates the setting of script commands to a preselected display mode;

FIG. 10 illustrates the contents of a VRR file;

DETAILED DESCRIPTION OF THE INVENTION

The embodiments of the invention include display methods, encoding methods and tools. With regard to display methods this includes a single media file format that is converted to various display formats on the user side; stereoscopic media in a window such as a browser or application; stereoscopic preservation in a window during scrolling and window movement; support of auto-detection 3D stereo hardware systems; script buttons (VRR scripts) to change global stereo formats; stereo media file formats that contain sub media such as VRR and blocks; parallax shift adjustments based on physical size of display window; automatic brightness adjustments; color calibration/adjustments for physical 3D viewing mechanisms, including variations in display devices; crosstalk reduction techniques on user side; smart stereo scaling; integration of stereo media types into one viewer with script interaction; monoscopic and stereoscopic viewing that allows greater distribution since both types can be viewed within one system; save and conversion of one format into another from the Internet using a local drive from the original source; automatic free view image size adjustment to minimize viewing fatigue; pseudostereo correction based on image processing of a few lines or the entire image; scaling stereo media, so that the left and right sources are preserved; and improvements to Anaglyph display methods. Since the format of the original left and right is known, as designated by the tag within the Stereoscopic 3D Media file, the scaling can be done while preserving stereo. Additionally, looking at the storage method used, it is necessary to take the appropriate actions to scale the media while preserving the stereo and to perform scaling done to increase or decrease the display size of the stereoscopic media.

Figure 1:
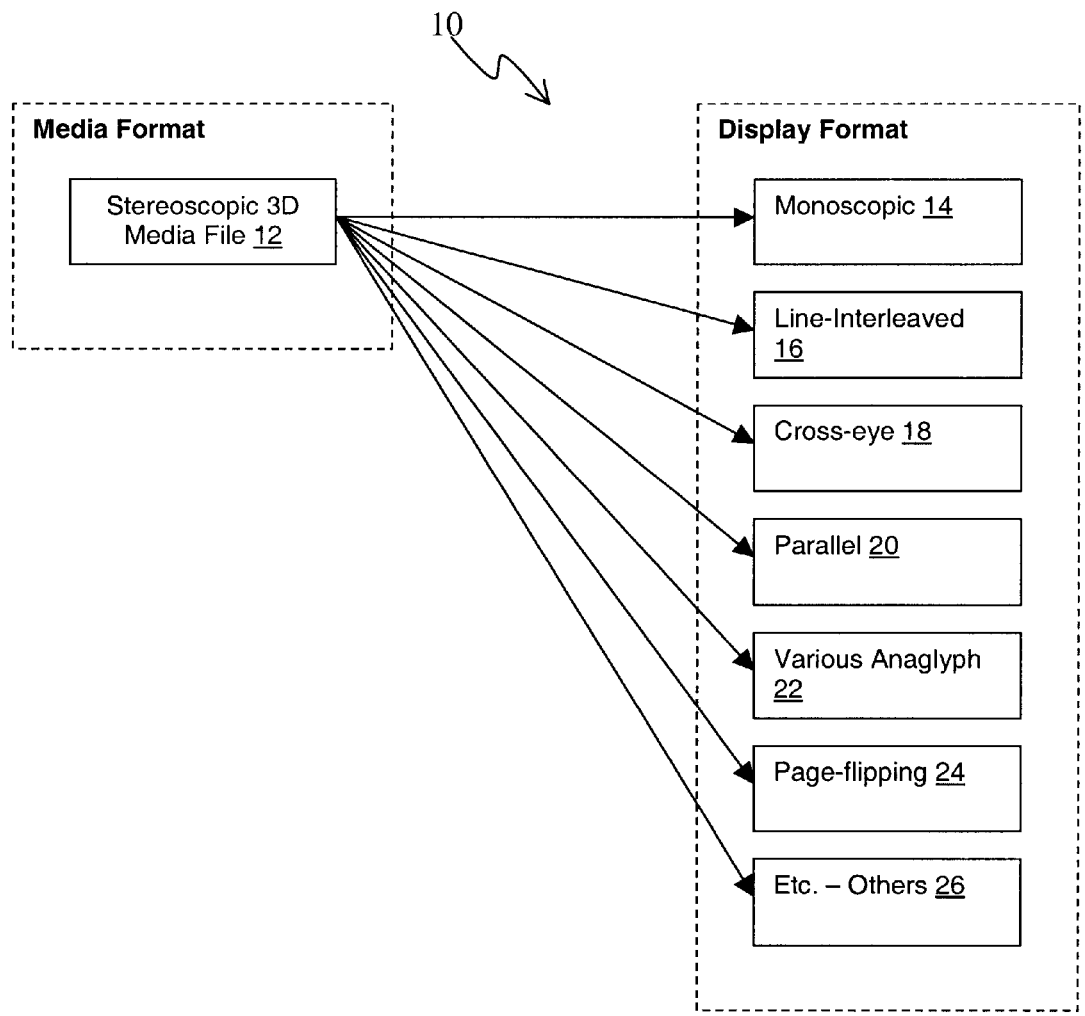
FIG. 1 illustrates the various display formats embodied in the invention.

In existing systems, stereo media can only be viewed at the original size. The embodiment of FIG. 1 provides a mechanism to increase or decrease the size at which the media is displayed while preserving the stereo. As shown in FIG. 1 with analysis 10, the left and right media are extracted from the Stereoscopic 3D Media file 12, scaled, recombined into the selected display method, then the resulting scaled Stereoscopic Media is displayed. The displayed formats include Monoscopic 14, Line-Interleaved, Cross-eye 18, Parallel 20, Various Anaglyph 22 Page-flipping 24 and Others 26.

Another embodiment of the present invention is to provide a system to access 3D stereoscopic content through the internet or an intranet or similar network environment where the 3D stereoscopic content is stored in a location that is not physically connected to the users workstation and to also provide a means to view content that resides locally on the users workstation.

The encoding processes used include independent compression of the Left and Right images. Independent compression of Left and Right provides better quality display output. A good example of this is anaglyph method. The methods include a video setup format for compression (sbs format and asf). Inage alignment reference points/indicators are used to aid in visual image alignment. Object viewers in stereo use multiple sub images for a one dimensional or two-dimensional object viewer. The use of stereoscopic panning preserves the stereo image alignment. The co-existence of Java software and a plug-in solution minimizes downloading. Image interpolation is used to generate in between stereo views to minimize or maximize the stereo separation. Image interpolation is used for converting a 2D object movie to a 3D stereoscopic object movie. Also, the methods provide a background download capability.

Several tools are used in the process. These include automatic stereoscopic alignment and/or re-alignment (rotational and shift and scale) and a stereo compression analysis tool to detect if the stereo information is preserved after compression.

Stereoscopic preservation in a window during scrolling and window movement is very important. When interleaved stereo images are displayed in a window, the first line of the image must be on an even scan line, or else the image will be perceived in reverse stereo. The system looks at the current vertical location of the window, and then places the first line of the stereo image on an even scan line. Whenever a user scrolls within that window, or moves the window itself, the application checks the odd/even status, and adjusts accordingly. In the case of vertically scrolling within a window or if the window itself is moved, the first line of the stereo image is placed on an even scan line. When the image is scrolled vertically, movement is done in even increments so as to maintain stereo or the right and left images are swapped for each pixel move to maintain stereo. For the case of horizontal scrolling, the same methods as vertical scrolling apply.

To display interleaved stereo images in a window or on a full-screen, the left and right fields or views must be preserved and presented consistently. For example the first horizontal line of a stereo image that is presented within a window may represent the right field or view and the second horizontal line the left field or view. In this example, the first horizontal line of the display device is even, or represented by a zero, the right field/view is to be presented on even scan lines, and the left field/view is to be presented on odd scan lines to maintain stereo. If the left field/view were presented on the even scan lines and the right field/view on the odd lines, then the result would be pseudostereo. The selection of associating the right field/view with even scan lines is arbitrary—the reverse can also be true provided consistency is maintained. The left field/view may be on the odd scan lines, the right field/view on the even.

The exemplary embodiment preserves left field/view and right field/view in a several ways. A first method is to snap the window to an even scan line, which ensures that the window starts on an even horizontal scan line. Another method is to look at the even/oddness of the first horizontal line where the stereo media starts. If the right field/view is on the even scan line, and the left field/view is on the odd, then no action is required, otherwise the left/right fields/ views can be swapped—placing the left content on the even lines, and the right content on odd, for every horizontal line in the media, thereby resulting in a stereo image. The third method is to shift the entire viewing region within the window by one horizontal line to match right field/view with an even scan line and left field/view with an odd scan line. This may require dynamic resizing of the window to accommodate the vertical shift.

An algorithm looks at the current vertical location of the window, and then places the first line of the stereo image on an even scan line. Whenever a user scrolls within that window, or moves the window itself, the application checks the odd/even status, and adjusts accordingly. In the case of vertically scrolling within a window or if the window itself is moved, the first line of the stereo image is placed on an even scan line. When the image is scrolled vertically, movement is done in even increments so as to maintain stereo. Stereo can be maintained by controlling the window position, forcing it to snap to even scan lines. The solutions include moving the window, moving the image, and swapping fields.

Figure 2:
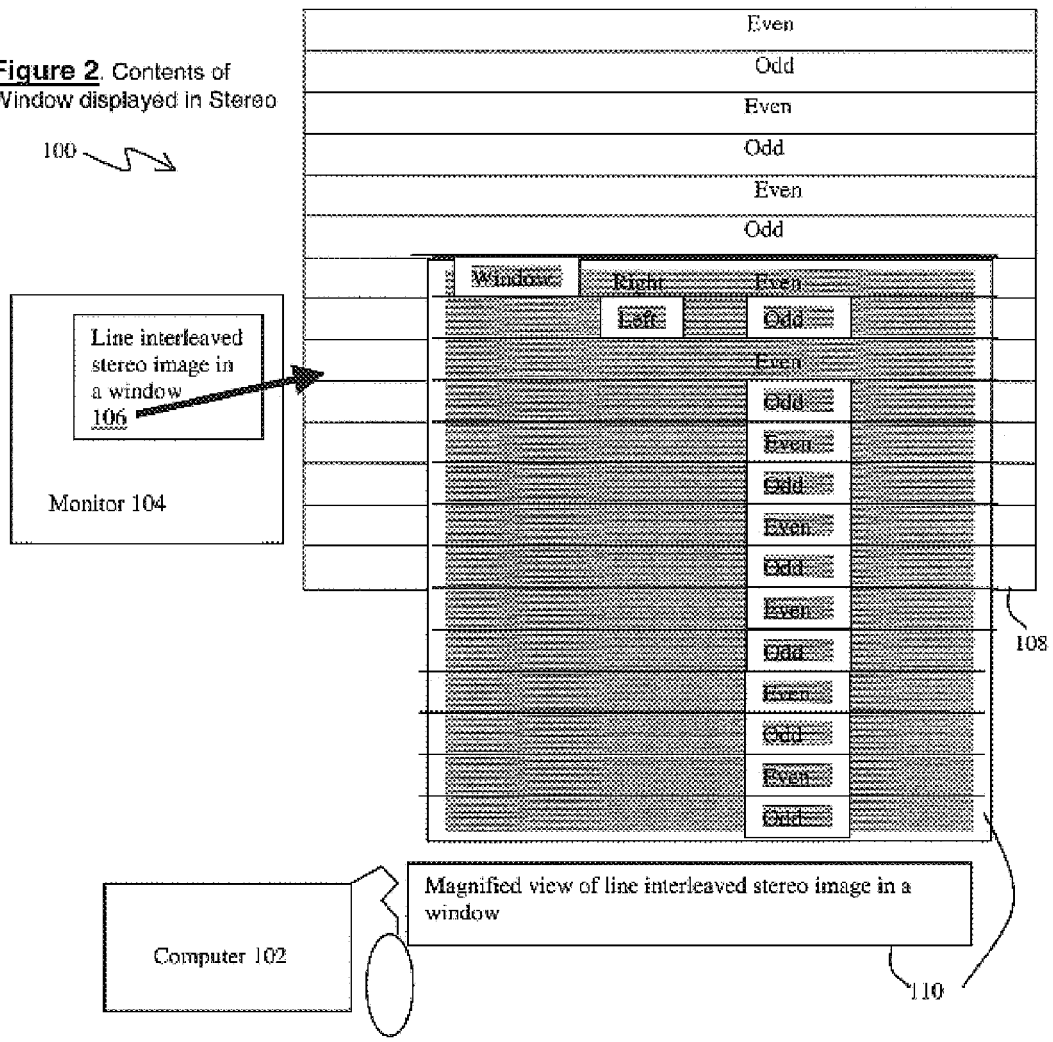
FIG. 2 illustrates the contents of a window displayed in stereo.

FIG. 2 illustrates the contents of a window displayed in stereo 100. A computer 102 and its monitor 104 are used to display a line interlaced stereo image 106 and 108. The stereo image is presented in a magnified form 110. This window could be a standalone application, plug-in, or interpreted program. The magnification shows the details of a line interleaved stereo image. The even line of the stereo image is aligned with an even scan line of the monitor, which results in the display of a stereoscopic image. If the window moves, a check is done to determine even/odd scan-line, then the stereo image is started on an even scan line. If the window is moved, it will snap to start on an even scan line.

Figure 3:
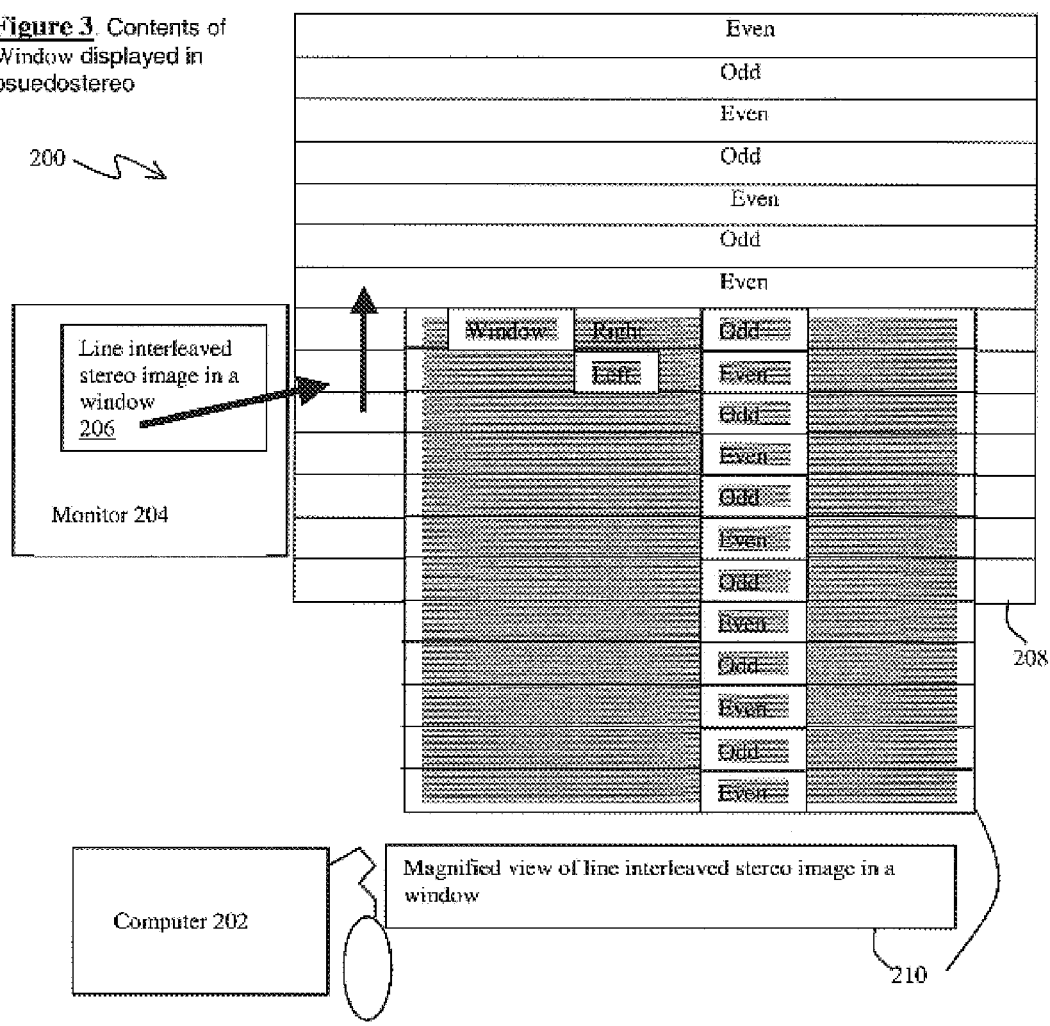
FIG. 3 illustrates the contents of a window displayed in reverse stereo.

FIG. 3 illustrates the contents of window displayed in reverse stereo 200. A computer 202 and its monitor 204 are used to display pseudoscopic or reverse stereo image 206 and 208. The pseudoscopic, or reverse stereo image is presented on the computer screen in a window. This window could be a standalone application, plug-in, or interpreted program. The magnification 210 shows the details of a line interleaved stereo image. The even line of the stereo image is not aligned with an even scan line of the monitor, which results in the display of a pseudoscopic, or reverse image.

Figure 4:
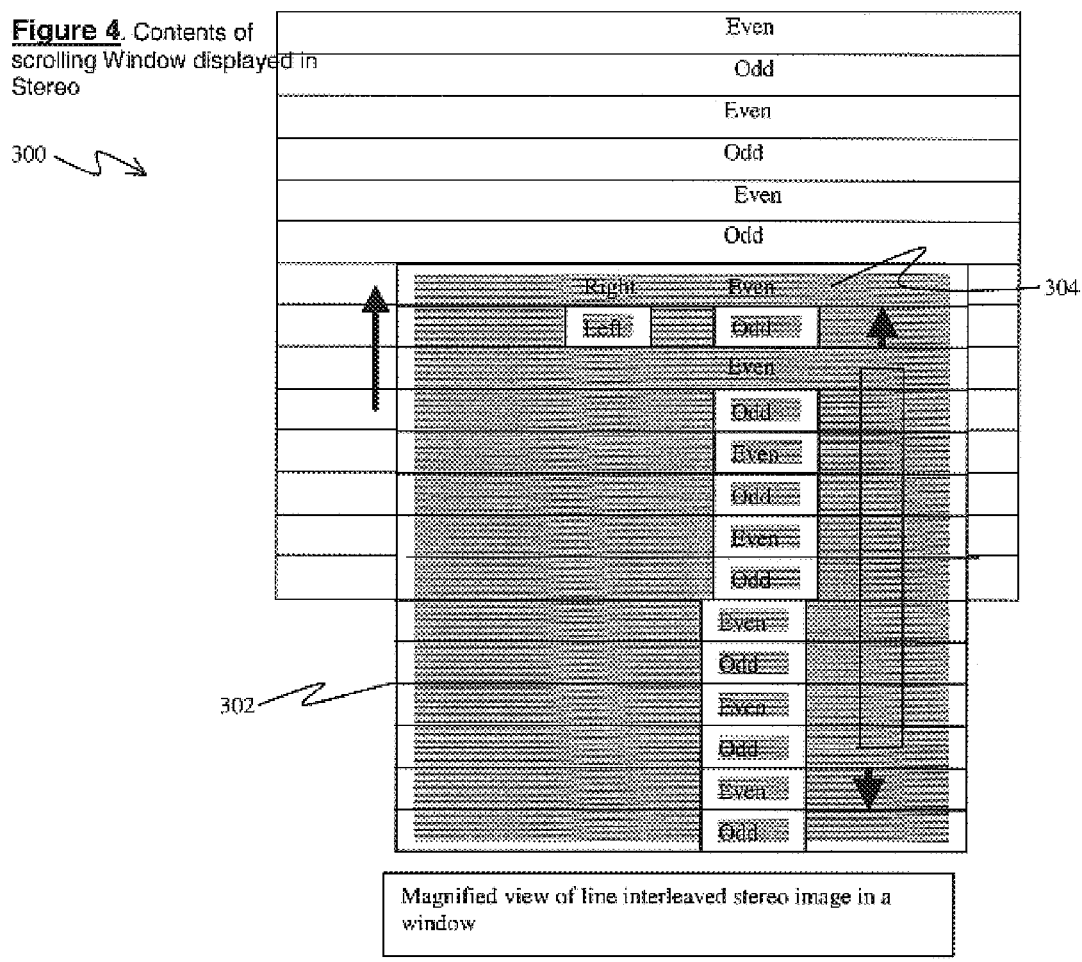
FIG. 4 illustrates the contents of a scrolling window displayed in stereo.

FIG. 4 illustrates the contents of a scrolling window displayed in stereo 300. A stereo image is presented on a computer screen in a window 302. This particular window scrolls vertically. The first line of the image is aligned on an even scan line 304 with the monitor, which allows for stereoscopic presentation. Whenever vertical scrolling occurs, even increments are made so that the image is always presented in stereo.

Figure 5:
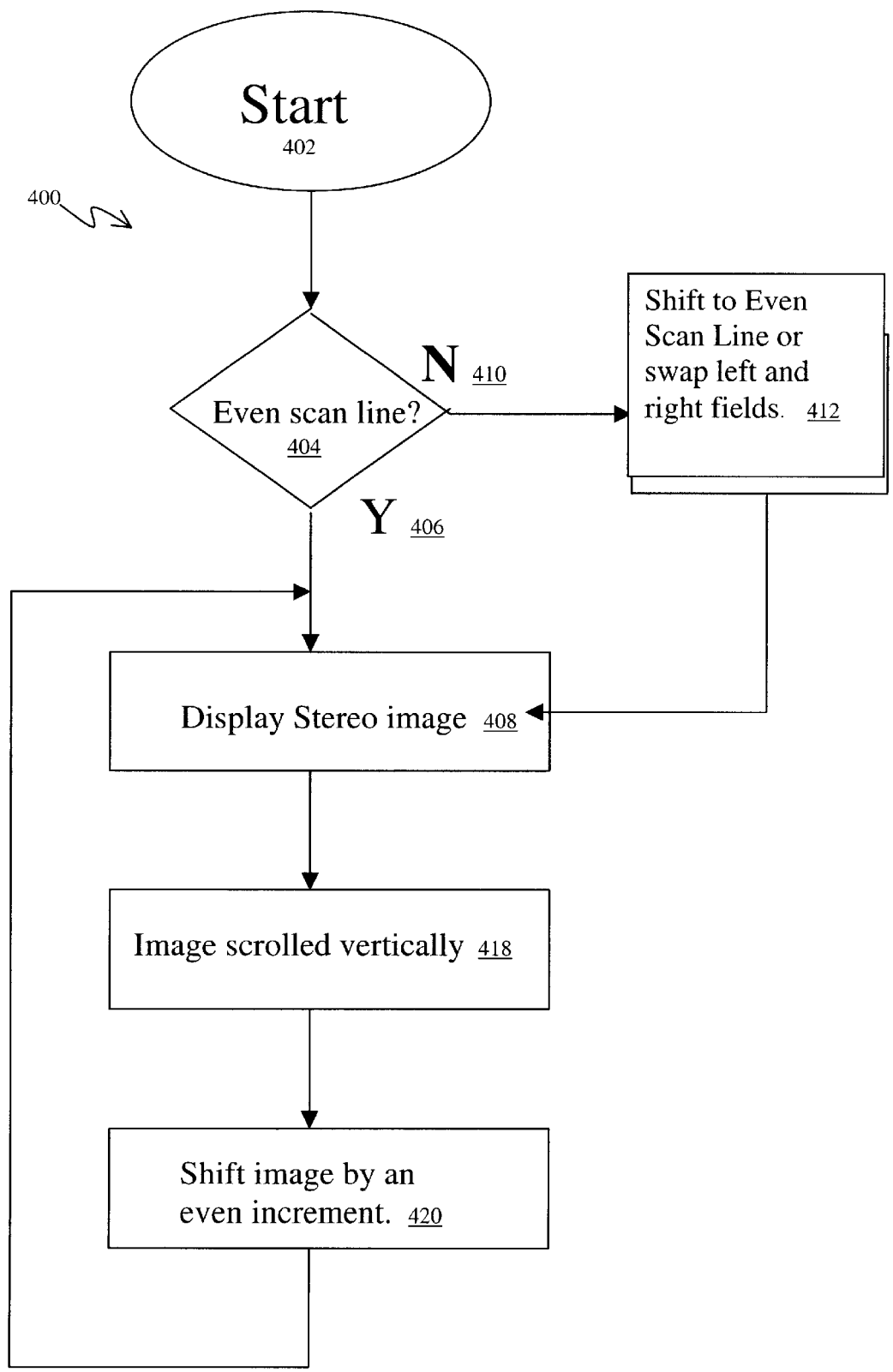
FIG. 5 illustrates a general software flowchart.

FIG. 5 illustrates a General Software Flowchart 400. Upon start 402, the application checks to see where the image starts, on an even or odd scan line 404. If on an even scan line 406, a stereo image is then displayed 408. If the image starts on an odd scan line 410, then the image is shifted to an even scan line or the left and right field/views are swapped and then displayed 412. Vertical scrolling begins 418 and is done by an even increment 420.

To scale stereo media, the left and right source must be preserved. Since the format of the original left and right is known, as designated by the tag within the Stereoscopic 3D Media file, scaling can be done while preserving stereo. An embodiment ooks at the storage method used, then takes the appropriate actions to scale the media while preserving the stereo. Scaling may done to increase or decrease the display size of the stereoscopic media.

Figure 6:
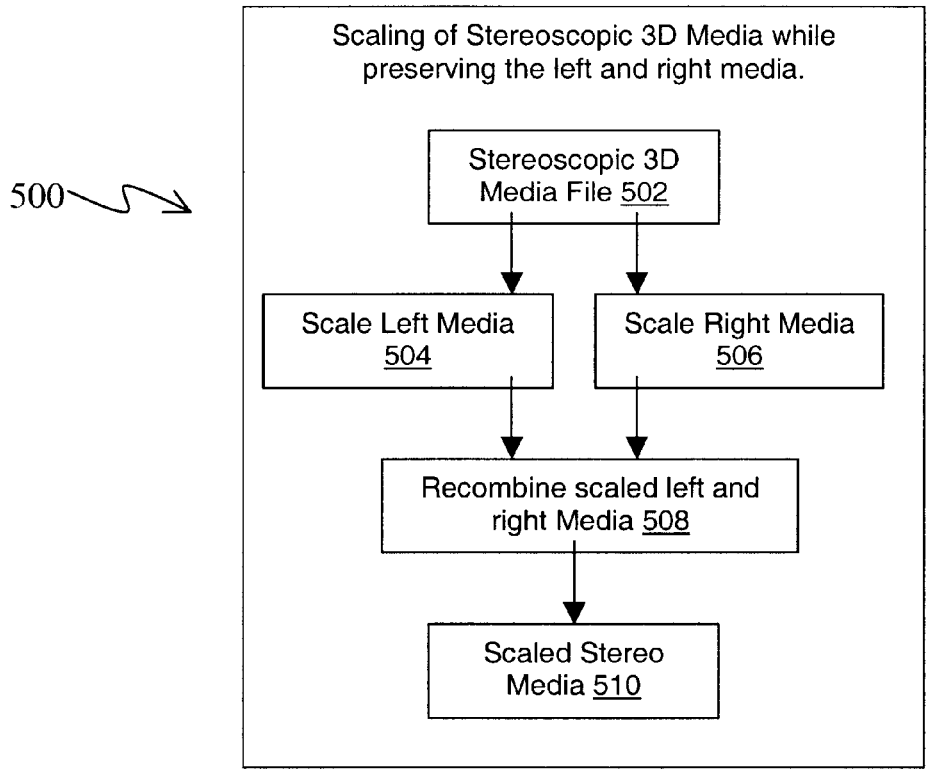
FIG. 6 illustrates the scaling of stereoscopic 3D media while preserving the left and right media.

FIG. 6 illustrates an analysis of the left and right media 500 that are extracted from the Stereoscopic 3D Media file 502, individually scaled 504, 506, recombined into the selected display 508, and then the resulting scaled Stereoscopic Media is displayed 510.

To scale stereo media, the left and right source must be preserved. Since the format of the original left and right is known, as designated by the tag within the Stereoscopic 3D Media file, the scaling can be done while preserving stereo. The system will look at the storage method used, and then take the appropriate actions to scale the media while preserving the stereo. Scaling may done to increase or decrease the display size of the stereoscopic media.

In existing systems, stereo media can only be viewed at the original size. An embodiment provides a mechanism to increase or decrease the size at which the media is displayed while preserving the stereo.

Figure 7:
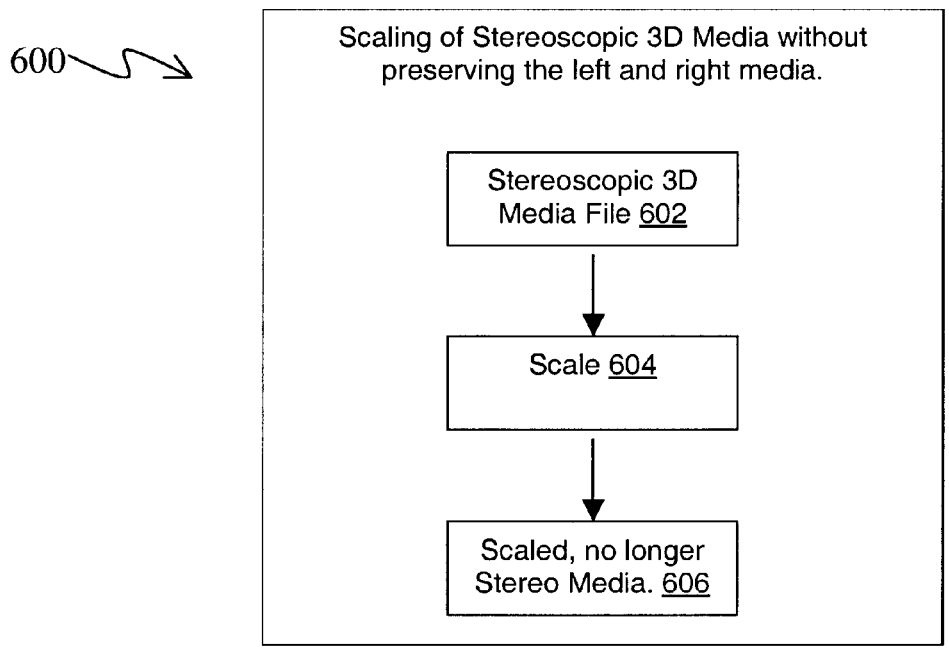
FIG. 7 illustrates the scaling of stereoscopic 3D media without preserving the left and right media.

FIG. 7 illustrates that without any analysis 600, if the Stereoscopic 3D Media File is scaled without regard for the format used for the left and right, the scaled result will not be in stereo. Without any analysis, the Stereoscopic 3D Media Files 602 and 604 are scaled without regard for the format used for the left and right, the scaled result will not be in stereo 606.

Monoscopic and Stereoscopic Viewing allows greater distribution since both types can be viewed within one system. Prior Electronic Stereoscopic viewing systems only display stereoscopic media. The embodiments of the invention accommodate monoscopic and stereoscopic viewing. The embodiments of the invention allow users to access stereoscopic media without a 3D stereoscopic enabled physical viewing device. This invention can have greater distribution and market penetration since it is not dependent upon a physical viewing device. This viewing system can be toggled to display monoscopic, as well as various stereoscopic modes (color anaglyph, gray anaglyph, line interleaved, page-flipping, cross-eye, parallel viewing, etc.). In monoscopic mode, the image appears in 2D like other 2D web based images which allows all web users to view the images in 2D even if they do not have a stereoscopic viewing device.

This is accomplished by showing either the left or right mono image. The user can select whether to view the left or right monoscopic view. Users without a physical stereo viewing device can see the media in monoscopic form by selecting to use either the right or left monoscopic views.

An embodiment of the invention contains automatic adjustment of Brightness/Contrast/Image properties adjustment based on viewing mechanism. No prior Electronic viewing system adjusts media brightness/contrast based upon the display method. This embodiment adjusts the final display of the stereo media to accommodate LC shutter-glasses, and LC shutter-glasses with line-blanker type products. When stereo media is viewed through an LC shutter-glass viewing system it appears darker due to the shuttering system. Additionally when stereo media is viewed through an LC Shutter-glass coupled with a line blanker, the media appears even darker. This embodiment will adjust the brightness, contrast and other media properties to compensate for the color distortion/darkness incurred by the viewing mechanism. FIG. 8 illustrates the automatic adjustment of Brightness/Contrast/Image properties adjustment based on viewing mechanism 700. The Stereoscopic Media file 702 is queried and is displayed using shutter glasses 704. The Brightness adjustment system 706 adjusts the brightness of the media file to accommodate the physical viewing mechanism 708. This same embodiment can compensate for uneven image luminance between the left and right eyes when using anaglyphic colored viewing glasses.

Algorithms are used to reduce crosstalk between the left and right views. Other stereoscopic viewing systems do not incorporate a system to reduce crosstalk. Crosstalk often appears in stereo media and can be referred to as ghosting. Bright in one eye, dark in the other, occupying the same point in the scene can create crosstalk. Areas of high contrast in stereo media are subject to crosstalk. This ghosting occurs because each eye is seeing some of the media intended only for the other eye, and in this case there may be very bright content in one eye, and darker content in the other eye.

For example, the right eye could see the media intended for the right eye, but also some of the media intended for the left eye. Seeing both at once through one eye shows up as a form of ghosting. This invention locates points where crosstalk may occur, and adjusts the displayed stereo image to reduce or eliminate crosstalk. The system can query the hardware or the user to determine the optimum crosstalk reduction amount for a particular viewing system.

Script buttons (vrr scripts) are used to change global stereo formats. An embodiment of the invention provides a novel method to switch the current display method for all stereo media currently displayed on-screen. For example, ten stereoscopic media files can be displayed on one web page. The display mode for each of those files can be changed with one command. Once a stereo display method is selected, then each of the stereo windows is notified to switch to the newly selected format. Typically, the user would be required to change the stereo display method for each stereoscopic image or media file.

Using a script system, the viewing system is instructed to change display modes on the fly. The user can issue a command using a script to specify any viewing mode. All stereoscopic media files that are displayed on that web page are then dynamically switched to the new viewing method. FIG. 9 illustrates a script command to set the display mode to Color Anaglyph 900. The Web Page as received has media files as illustrated by Stereo Image Grey Anaglyph 904; Stereo Image Color Anaglyph 906; Stereo Image Cross-eye 908 and Stereo Image Parallel 910; Stereo Image Interleaved 912; and Stereo Image Interleaved 914. With the Button: Set to Display mode to Color Anaglyph 916, the Script Commands sets the Display Mode Color Anaglyph 918. The system converts all the media files to Color Anaglyph as illustrated by files 920 through 930. This embodiment is critical in providing an easy to use 3D stereoscopic viewing system.

There is an embodiment that saves and converts one format into another from the Internet using a local drive from original source. The viewing system takes a Stereoscopic Media File, displays it on the user side according to the user's display preferences, and saves a local copy in whatever display format the user selects. The system can convert the Stereoscopic Media into the display method selected by the user, and save the result on the user's local drive. Alternately, the original form of the Stereoscopic 3D Media file may be saved on the user's local drive. This embodiment makes it possible to support special 3D formats that are not easy to generate in real time.

A color calibration/adjustment for physical 3D viewing mechanisms, compensates for variations in the display devices. An embodiment includes the functionality to adjust stereo media properties, thereby preserving the original color, hues, saturation, etc. when viewed through a physical viewing mechanism. For example, when looking through liquid crystal shutter-glass systems, the LC may introduce additional yellow coloring to the subject matter. Based on the user's view settings that tell the originator what kind of viewing device the user may be using. Another embodiment of the invention corrects for distortions introduced by the viewing mechanism. Another example could be for anaglyph viewing. For this example, the viewing system goes through a color calibration to attempt to more closely match the coloring of the anaglyph lenses with the coloring of the monitor or display device.

A stereo media file format may contain certain sub media such as VRR and blocks. An embodiment supports a stereoscopic media file that contains sub-media. Specifically, a file structure is created to store and preserve various types of stereo media in various formats. Additionally, this file format can also store monoscopic media, as well as audio or other data. This one file format can store multiple or single stereo/non-stereo media elements. FIG. 10 illustrates a VRR file 1000 that may contain a script 1002, a Stereo Still Image 1004, a Stereoscopic Animation/movie 1006, Stereoscopic Object Model 1008, a Thumbnail 1010, and Audio 1012. This embodiment also allows multiple resolution images to be stored in one media file or to be referenced (linked to) from one media file.

The system may also include an automatic free view image size adjustment to minimize viewing fatigue. For example, when parallel-viewing (also known as relaxed viewing, or free-viewing) stereo images, the separation of the left and right should not greatly exceed the average interocular distance of an adult.

Figure 11:
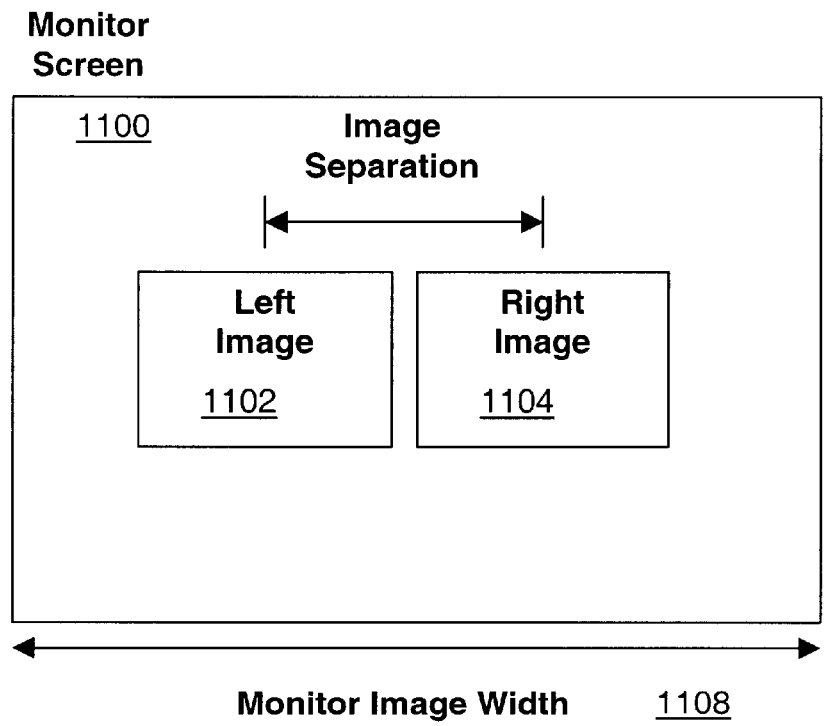
FIG. 11 illustrates a parallel viewing mode.

FIG. 11 illustrates a parallel viewing mode. For parallel viewing, it is important that the right 1104 and left 1102 images be scaled and spaced so as to not exceed the viewer's eye spacing. If the viewer has a prismatic viewing aid, the image separation can be increased. The users can be queried to determine what viewing system is installed. Since most computer operating systems now store information on the width 1108 of the monitor image on the display monitor, it is possible to automatically adjust the spacing and size of the right and left images to avoid eyestrain.

Figure 12:
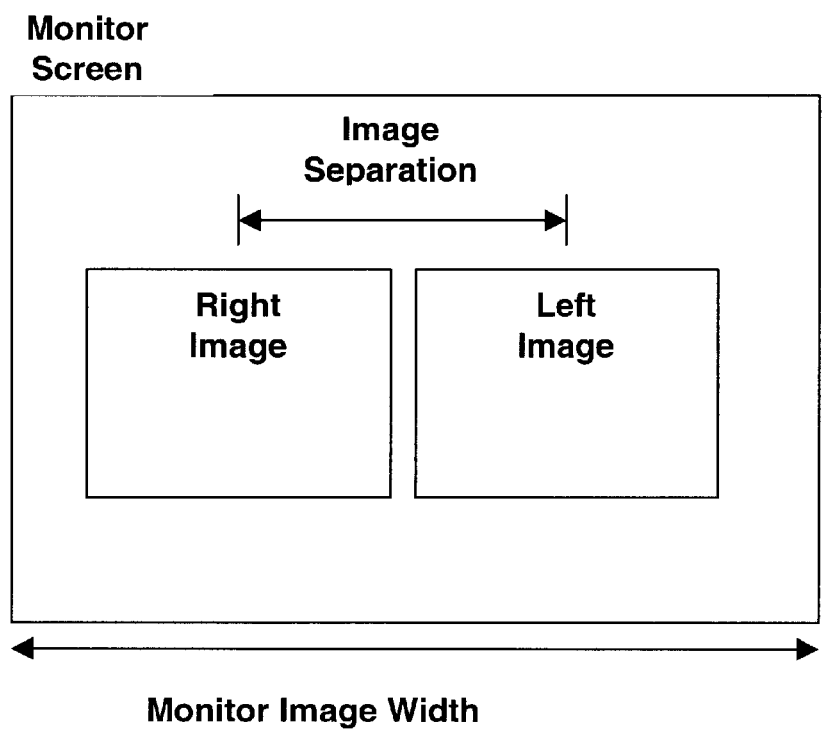
FIG. 12 illustrates a cross-eye viewing mode.

FIG. 12 illustrates a cross-eye viewing mode. For crosseye viewing, it is possible to use larger images than with the parallel viewing method. There is still a limit where many users will begin to experience eyestrain. The user can be queried to determine the limits of cross-eye viewing.

Another embodiment allows for automatic detection of 3D display hardware. Many 3D stereoscopic hardware vendors install software that can be detected so that an appropriate display method can be automatically selected. If no stereoscopic hardware is detected, then the system must prompt the user to configure the display mode.

Another embodiment automatically (or manually if desired) adjusts with overall left and right image shift to compensate for image magnification. When a 3D stereoscopic image is enlarged and displayed on a viewing system that has a larger image size then the target system, there is a potential of creating large separations between objects in the 3D stereoscopic image that can lead to eyestrain for the viewer. The present invention stores important parameters about the 3D stereoscopic image like width, height, target screen size, etc. When the 3D stereoscopic image is to be displayed on a display that is larger or smaller than the target screen size, then the 3D stereoscopic image is adjusted accordingly to minimize eye fatigue for the user.

One embodiment utilizes image processing to detect pseudo-stereo 3D stereoscopic content. It is common for content authors to sometimes reverse the right and left eyes when creating 3D stereoscopic content. When this happens, the display system will present the wrong image to the viewer's eyes. This embodiment attempts to correct this problem by comparing portions of the right and left image content to determine if a pseudo condition exists and then swaps the right and left images to correct for the problem.

Another embodiment encodes the full-color left and right images in separate channels and compresses the left and right channels independently. This technique provides less compression artifacts and reduces crosstalk when compared to anaglyphic storage techniques. In comparison, analgyph storage techniques, which are widely used on the Internet, combine the right and left images in separate color channels of a single image and then compressed the resulting image. This technique results in the introduction of crosstalk because most compression techniques, like JPEG that is commonly used, reduce the color space of an image drastically, which in turn compromises the quality of the Anaglyphic storage technique.

Figure 14:
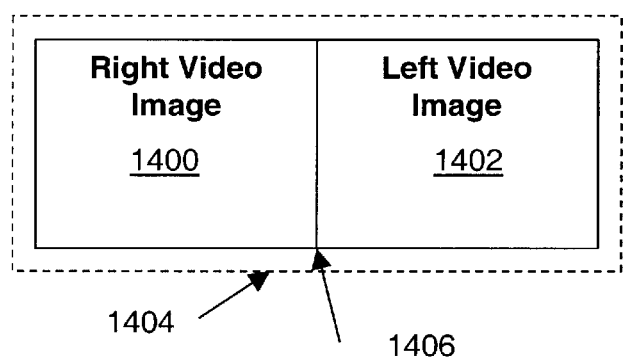
FIG. 14 illustrates the side by side format.

<Another embodiment allows video to be stored in a side-by-side format in a single video-streaming file. This encoding method allows the right and left channels to be independently compressed which provides the best quality and ensures that the correct right and left image pair are matched up and that the images will not get out of synchronization during a long streaming session. In contrast, if two separate streaming channels were used, extra processing power would be required to manage two channels and ensure that they remained synchronized. FIG. 14 illustrates the side-by-side format. The right image 1400 is placed to the left of the left image 1402 to form the composite image 1404. The composite image is twice as wide as either the left or right source images. For improved compression quality when using some compression systems, a vertical colored separator band 1406 can be added between the right and left image. Some compression systems work better with this separator band.

Figure 15:
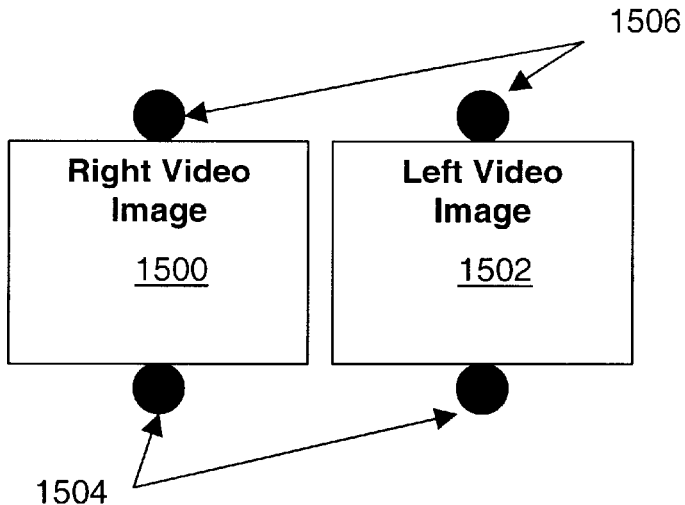
FIG. 15 illustrates one method of displaying helper alignment images for a cross eye viewing mode.

Another embodiment of the display system is to create alignment dots or reference images to help the viewer view cross-eyed or parallel view image formats. FIG. 15 illustrates one method of displaying helper alignment images for a cross-eye viewing mode. In this example, the helper images are placed below the image 1504 and above the image 1506 and are aligned with the center of the right and left images. The helper images could also be shifted towards the edges of the right and left images. The images are of high contrast and attract the viewer to fuse the images first before the primary 3D stereoscopic image is viewed. The simple high contrast nature of the alignment images allows them to be more easily viewed. This system makes it possible for viewers with poor stereo viewing capabilities to see more stereoscopic content with the cross-eyed, parallel, and other viewing modes.

Figure 16:
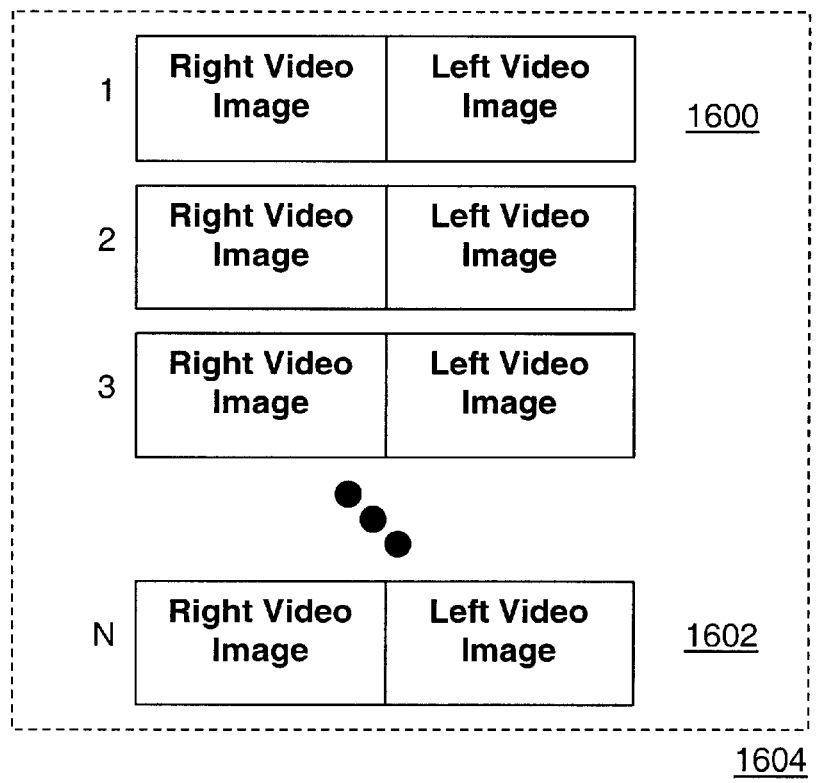
FIG. 16 illustrates one way to store a series of N images into a single resource file.
Figure 17:
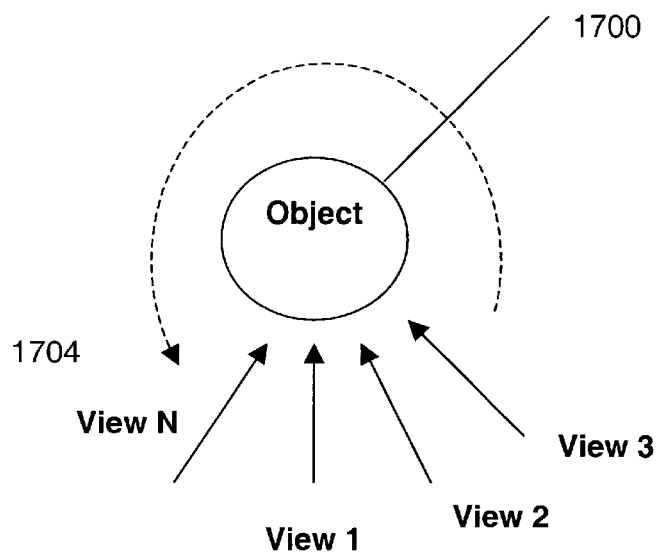
FIG. 17 illustrates the relationship between the images and the object in question.

One embodiment stores a series of 3D stereoscopic images of an object into one file. FIG. 16 illustrates one way to store a series of N images into a single resource file. The first image 1600 is at the top of the file and the rest of the images follow sequentially until the last file 1602. The collection of these images forms an object movie data file 1604. FIG. 17 shows the relationship between the images and the object in question 1700. As the figure illustrates, the point of view of the camera is swung around the object to generate all of the intermediate images. When these images are displayed in a sequential fashion, it appears that the object is rotating on the screen in 3D depth. When the images are displayed in reverse order, the object appears to turn in the opposite direction. If the playback of the images is linked to the right/left movement of a mouse point on the screen, it will appear that the user is actually rotating the object on the screen. This example illustrates a one dimensional object movie. It is possible to store additional sets of rotational images sets to simulate other views of the object (example: doors open or closed on a car model).

Figure 18:
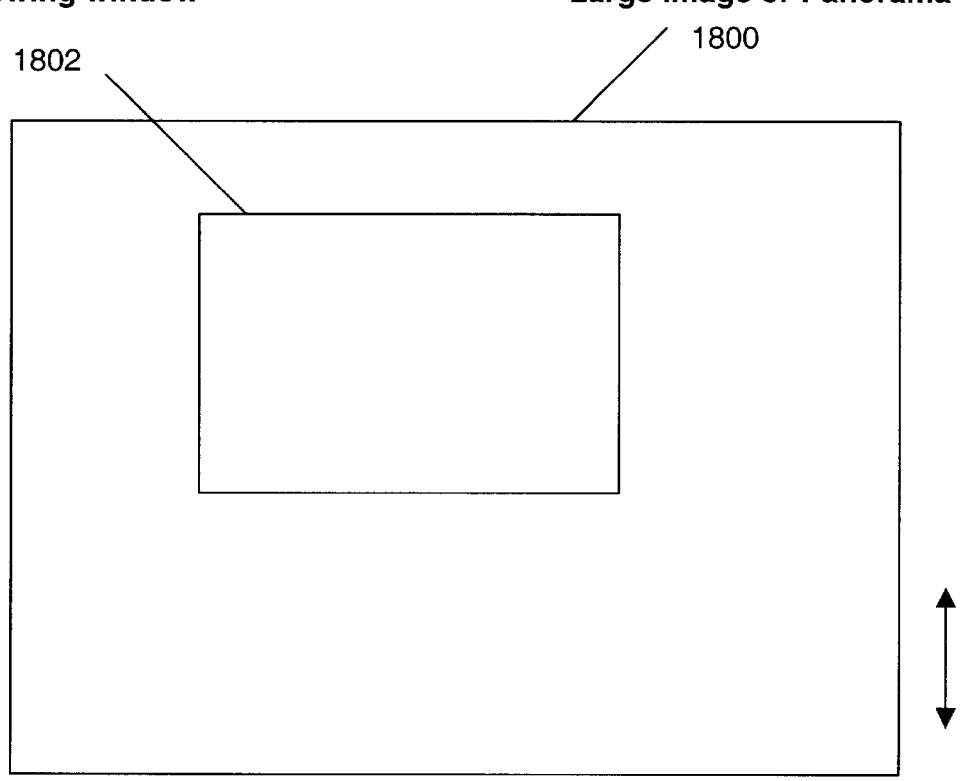
FIG. 18 illustrates an embodiment that allows a larger 3D stereoscopic image or panorama to be scrolled within a smaller viewing window.

Another embodiment allows a larger 3D stereoscopic image or panorama to be scrolled within a smaller viewing window as shown in FIG. 18. The viewing window 1802 is a fixed size and does not move with respect to the viewing screen. The 3D stereoscopic image 1800 is larger than the viewing window and therefore must be scrolled horizontally and vertically within the viewing window in order for the viewer to see the entire image. This is always the case with panoramic images that contain a very wide or tall view of a scene. When the image is panned within the viewing window, the invention ensures that the left and right views are presented to the correct eyes. For example, in the row interleaved viewing method, if the larger 3D stereoscopic image is moved vertically by a single pixel, the image will flip into pseudostereo mode. The present invention will either shift the image an additional line to make it viewable in non-pseudostereo or it will flip the left and right images to correct the problem. This embodiment is an extension of the previously described scrolling embodiment since it applies the scrolling embodiments to an image that is scrolled within a viewing window as opposed to a viewing window which is scrolled on the display screen (as previously detailed).

Another embodiment allows the previously discussed display embodiments to be extended to a wider viewing audience on the Internet and for local viewing on a workstation by implementing the invention on multiple parallel systems. For example, for viewing 3D stereoscopic content on the Internet through a browser, it is desirable to have uniform support for all browser systems. The present invention provides uniform support by implementing several parallel solutions. In particular, the present invention can be implemented as a Netscape plug-in to support the Netscape browser (see www.netscape.com) or the present invention can be implemented as an Active-X control to support the Microsoft Internet Explorer Browser (see www.Microsoft.com) or the present invention can be implemented as a Java Applet (see www.sun.com) to support some other forms of browsers. The embodiment described here implements the present invention on all of these systems in parallel and utilizes browser client side scripting and/or server side scripting (well known by someone skilled in web based systems) to select the correct system for a particular user. When a user points their browser to a particular website page which contains 3D stereoscopic content, the system of the present invention will determine which parallel system to use.

Figure 19:
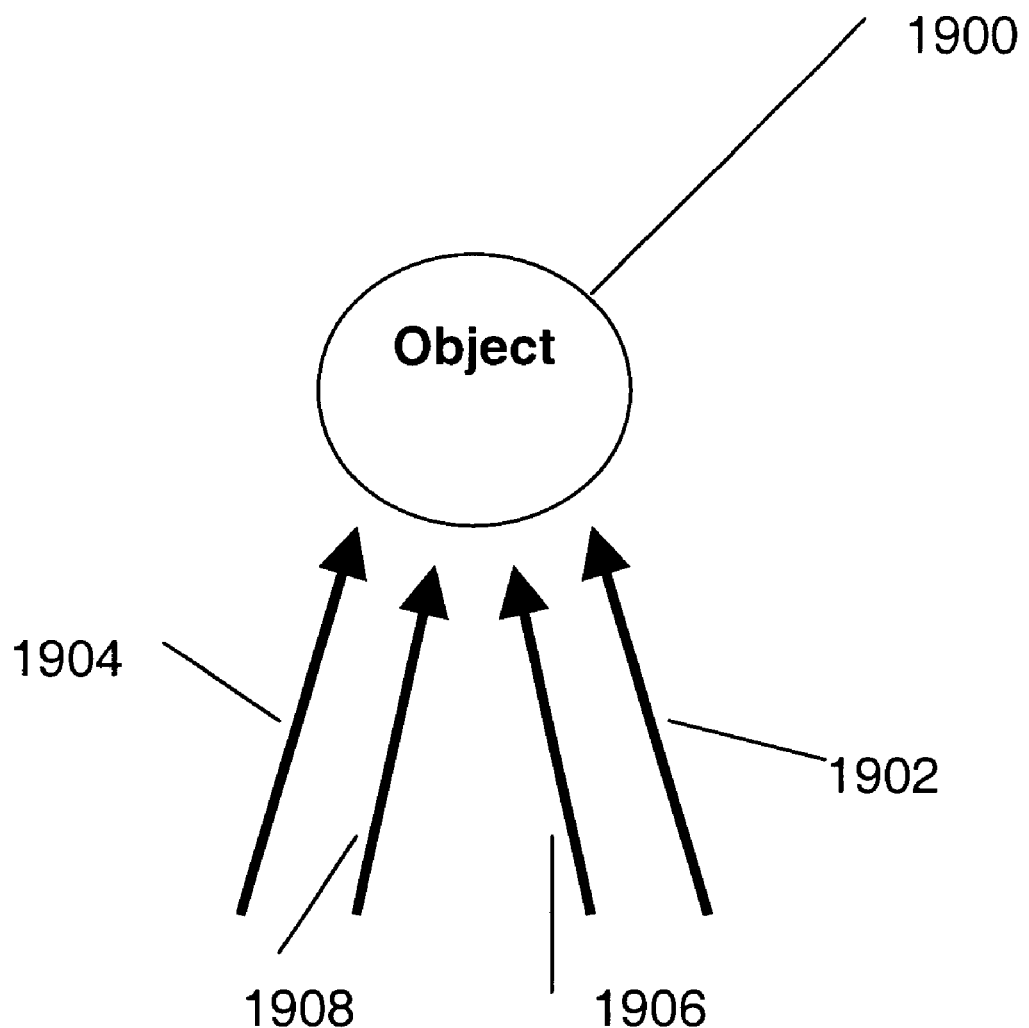
FIG. 19 illustrates an original right and left camera view of an object.

Another embodiment allows new right and left image views to be generated to simulate a new stereoscopic camera separation. Some viewers may find it hard to view some images if the original cameras were separated by a large amount. The current embodiment utilizes image interpolation and morphing techniques to synthesize a new right and left image that are closer together. The same technique can be used to simulate a wider stereoscopic camera separation to increase the depth effect. The amount of adjustment can be selected by the user to suit their viewing condition and capabilities. FIG. 19 illustrates an original right 1902 and left 1904 camera views of an object 1900. The new synthesized right 1906 and left 1908 views will be easier to view for some users.

Another embodiment of the invention provides an automatic alignment and/or re-alignment of the left and right images. Many 3D stereoscopic images are created incorrectly and may have vertical, horizontal, or rotational misalignment that will cause eyestrain for the viewer. Using image correlation techniques, horizontal and vertical misalignment of the right and left views is corrected. Further correlation is applied to correct for rotational alignment issues.

Another embodiment provides a tool that compares the left and right images to determine if stereoscopic information is lost during compression. Compression is used to reduce the size of a stereoscopic image so that it can be easily transmitted over a low bandwidth connection. If too much compression is applied, the image will loose its stereoscopic impact. This embodiment provides a measure of the quality of the stereoscopic image that can be used to readjust the compression system.

Another embodiment allows both local content, residing on the users workstation, and remote content, residing on a server or web site to be viewed using the display methods. This embodiment is needed to allow for remote streaming playback as well as to allow for local playback of files that are delivered via cd-rom or other storage means or for content that is downloaded from a remote location to a local storage location before being displayed.

Figure 13:
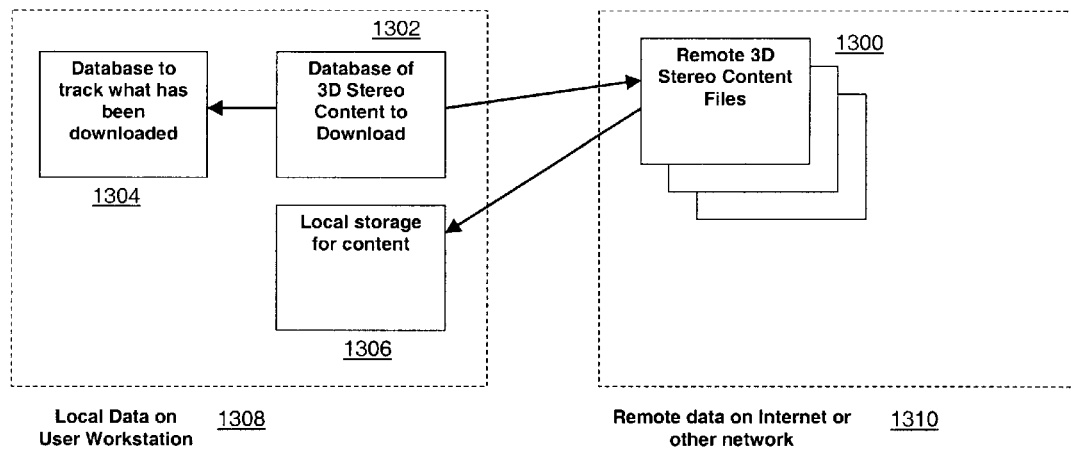
FIG. 13 illustrates the ability to download larger sized 3D stereoscopic content files as a background task or during idle use times of the workstation.

Another embodiment of the present invention provides the ability to download larger sized 3D stereoscopic content files as a background task or during idle use times of the workstation as shown in FIG. 13. These large sized files 1300 cannot be easily streamed over the Internet in real-time or near real-time. This background downloading capability allows the present invention to be more widely used on low-bandwidth systems. This embodiment utilizes a database of known locations where information about 3D content is stored 1302. A subscription system or search engine can be used to access the 3D content or specific content can be added to the download database. The system of the present invention keeps track of what content has been downloaded in a second database 1304 and records details about the download that can be used to recover a faulty download. The 3D stereoscopic content is moved from a remote location 1310 to a higher bandwidth local location 1308 where the content can be played back in real-time or near real-time. The download database and the 3D stereoscopic content location database are also used to help append 3D stereoscopic content into a larger local file. This method allows a very large or long content file to be broken into much smaller files that are downloaded one after the other. As each file is downloaded, it is appended to the current local copy of the download. If new remote content files are made available on a periodic basis, this system will allow them to be appended together as they become available.

Another embodiment allows conventional 2D object movies to be converted into 3D stereoscopic object movies. A conventional object movie utilizes a sequence of still images of an object captured a various view angles as illustrated in FIG. 17. A 2D object movie can be converted to 3D stereoscopic format by pairing up the original images. For example, in FIG. 17, View 1 and View 2 can be combined to form a left right pair (respectively). The next 3D stereoscopic view is formed by combining view 2 with view 3 (left and right respectively). Each image in the original object movie is used twice. If the original 2D object movie contains enough images (60 images produces good results) then the converted 3D object movie will be usable. If there are not enough images, less than 40, then better results are achieved if the previously mentioned embodiment of generating intermediate views using image interpolation can be applied to the object movie conversion. Using image interpolation allows intermediate stereoscopic views to be generated, which have much less camera separation and are easier to view.

The present invention can also be embodied in the form of computer program code, for example, whether stored in a storage medium, loaded into and/or executed by a computer, or transmitted over some transmission medium, such as over electrical wiring or cabling, through fiber optics, via electromagnetic radiation or via the Internet, wherein, when the computer program code is loaded into and executed by a computer, the computer becomes an apparatus for practicing the invention. When implemented on a general-purpose microprocessor, the computer program code segments configure the microprocessor to create specific logic circuits.

The modifications to the various aspects of the present invention described above are merely exemplary. It is understood that other modifications to the illustrative embodiments will readily occur to persons with ordinary skill in the art. All such modifications and variations are deemed to be within the scope and spirit of the present invention as defined by the accompanying claims.

What is claimed is:

1. A method for delivering stereoscopic media in electronic form comprising:
   providing a single format with independent right and left channels to represent the stereoscopic media;
   displaying said stereoscopic media inside a movable windowed area while eliminating pseudo stereo conditions during movement;
   optimizing adjustments of parallax shift adjustment, brightness control, color adjustment, and cross-talk reduction of said stereoscopic media based on viewing hardware, monitor size, and media content for optimal viewing quality and
   seamlessly supporting for monoscopic (2D) viewing modes allowing delivery of said stereoscopic media in a normal 2D viewing mode.

2. The method of claim 1, wherein said media includes images, videos, animations, and object models.

3. The method of claim 2 wherein delivering comprises locations including the Internet and electronic media.

4. The method of claim 3 wherein electronic media comprises optical media and magnetic media.

5. The method of claim 1 wherein a single media file format that is converted to various display formats on a user side.

6. The method of claim 1 further comprising a stereoscopic media in a window such as a browser or application.

7. The method of claim 1 further comprising stereoscopic preservation in a window during scrolling and window movement.

8. The method of claim 1 comprising supporting of auto-detection 3D stereo hardware systems.

9. The method of claim 1 comprising script buttons (VRR scripts) for changing global stereo formats.

10. The method of claim 9 further comprising stereoscopic media file formats that contain sub media such as VRR and blocks.

11. The method of claim 1 comprising parallax shift adjustments based on a physical size of display window.

12. The method of claim 1 further comprising automatic brightness adjustments.

13. The method of claim 1 further comprising automatic brightness adjustments.

14. The method of claim 1 further comprising crosstalk reduction techniques on a user side.

15. The method of claim 1 further comprising smart stereo scaling.

16. The method of claim 1 further comprising integration of stereo media types into one viewer with script interaction.

17. The method of claim 1 further comprising monoscopic and stereoscopic viewing that allows greater distribution since both types can be viewed within one system.

18. The method of claim 1 comprising saving and converting one format into another from the Internet using a local drive from an original source.

19. The method of claim 1 further comprising automatic free view image size adjustment to minimize viewing fatigue.

20. The method of claim 1 further comprising pseudostereo correction based on image processing of a few lines or the entire image.

21. The method of claim 1 further comprising scaling said stereoscopic media, so that left and right sources are preserved.

22. The method of claim 1 further comprising improvements to Anaglyph display methods.

23. A method for delivering stereoscopic content is electronic form through the internet or an intranet or similar network environment comprising:

storing said stereoscopic content in a location that is not physically connected to a users workstation; and providing a means to view content that resides locally on the users workstation, wherein the encoding processes used included independent compression of Left and Right images.

24. The method of claim 23 wherein Independent compression of Left and Right provides better quality display output.

25. The method of claim 23 wherein said compression uses an anaglyph method.

26. The method of claim 25 further includes:

a video setup format for compression (sbs format and asf).

27. The method of claim 25 includes using image alignment reference points/indicators to aid in visual alignment.

28. The method of claim 27 including using multiple sub images by object viewers in stereo for a one-dimensional or two-dimensional object viewer.

29. The method of claim 28 including using stereoscopic planning that preserve the stereo image alignment.

30. The method of claim 29 uses a co-existence of Java software and a plug-in solution to minimize downloading.

31. The method of claim 30 using image interpolation to generate in between stereo views to minimize or maximize the stereo separation.

32. The method of claim 31 using image interpolation for converting 2D object movie to a 3D stereoscopic object display and provide a background download capability.

* * * * *